(12) United States Patent
Ross

(10) Patent No.: US 7,561,515 B2
(45) Date of Patent: Jul. 14, 2009

(54) ROLE-BASED NETWORK TRAFFIC-FLOW RATE CONTROL

(75) Inventor: Alan D. Ross, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 876 days.

(21) Appl. No.: 10/951,393

(22) Filed: Sep. 27, 2004

(65) Prior Publication Data

US 2006/0072451 A1 Apr. 6, 2006

(51) Int. Cl.
*G01R 31/08* (2006.01)

(52) U.S. Cl. .................. 370/232; 370/230; 370/235; 370/229

(58) Field of Classification Search ............ 370/230, 370/232, 235; 709/229
See application file for complete search history.

(56) References Cited

U.S. PATENT DOCUMENTS

| | | | | |
|---|---|---|---|---|
| 5,950,195 | A * | 9/1999 | Stockwell et al. | 707/4 |
| 5,968,176 | A | 10/1999 | Nessett et al. | |
| 7,343,485 | B1 * | 3/2008 | Huang et al. | 713/153 |
| 2003/0191853 | A1 * | 10/2003 | Ono | 709/232 |
| 2004/0028059 | A1 * | 2/2004 | Josyula et al. | 370/396 |
| 2004/0039924 | A1 | 2/2004 | Baldwin et al. | |
| 2005/0027837 | A1 * | 2/2005 | Roese et al. | 709/223 |
| 2005/0157647 | A1 * | 7/2005 | Sterne et al. | 370/235 |
| 2006/0023709 | A1 * | 2/2006 | Hall et al. | 370/389 |
| 2006/0218302 | A1 * | 9/2006 | Chia et al. | 709/245 |

OTHER PUBLICATIONS

Matthew M. Williamson, et al., "Virus Throttling", *Virus Bulletin*, Mar. 2003, pp. 8-11, Virus Bulletin Ltd., Oxfordshire, England.
Matthew M. Williamson, et al., "Virus Throttling for Instant Messaging", *Virus Bulletin Conference*, Sep. 2004, Chicago, Illinois, pp. 1-9, Hewlett-Packard Company.
Jamie Twycross et al., "Implementing and Testing a Virus Throttle", *Proceedings 12th USENIX Security Symposium*, Aug. 4-8, 2003, Washington, DC, 11 pages, Hewlett-Packard Company.
Matthew M. Williamson, et al., "Design, Implementation and Test of an Email Virus Throttle", Jun. 2003, pp. 1-9, Hewlett Packard Company.
Matthew M. Williamson, et al., "Throttling Viruses: Restricting Propagation to Defeat Malicious Mobile Code", Jun. 2002, pp. 1-6, Hewlett-Packard Company.
Matthew M. Williamson, et al., "Throttling Viruses: Restricting Propagation to Defeat Malicious Mobile Code", *ACSAC Conference*, Dec. 2002, Las Vegas, Nevada, pp. 1-8, Hewlett Packard Company.

* cited by examiner

*Primary Examiner*—Ricky Ngo
*Assistant Examiner*—Kibrom T Hailu
(74) *Attorney, Agent, or Firm*—Blakely, Sokoloff, Taylor & Zafman LLP

(57) ABSTRACT

Traffic flow rate control in a network device. Traffic flow may be permitted/restricted based on the role of a device in a network. The traffic flow may be limited on the basis of packets per time period, the limits to be applied on a per-protocol, per-port, and/or per-packet basis.

17 Claims, 4 Drawing Sheets

ROLE-BASED NETWORK TRAFFIC-FLOW RATE CONTROL

FIELD

Embodiments of the invention relate to network traffic flow control, and particularly to packet-based control at a network-connected device.

BACKGROUND

Spread of malware and other computer attacks has increased focus on network security. Malware may include viruses, worms, or other malicious code meant to disrupt network service, impair computer performance, open holes for intrusion, etc. Computer attacks may include flooding a server with traffic/requests and/or other actions to overload a server or network and cause a denial of service (DoS) attack.

Traditional approaches to mitigating malware have focused on preventing infection of networked machines. Antivirus software is typically concerned with recognizing viruses by examining software for particular known signatures. Recognized viruses can be quarantined and/or destroyed. Traditional malware protection suffers many limitations in that new viruses are able to spread unchecked until the virus can be analyzed for a signature, and antivirus definitions can be updated on each individual machine. This may require considerable time and effort. Those who do not take advantage of the almost constant updates are more vulnerable to attack by viruses that are not in the outdated definitions. Many new viruses are also adaptable, and alter themselves as they spread, causing difficulty for antivirus software.

Another approach is virus throttling, introduced by researchers of HP Laboratories Bristol. See, e.g., Jamie Twycross, Matthew M. Williamson, "Implementing and Testing a Virus Throttle," Trusted Systems Laboratory, HP Laboratories Bristol, HPL-2003-103, May 21, 2003. The virus throttle approach recognizes that viruses typically spread by engaging in "abnormal" computer behavior, or behavior that is outside the expected norm of computer conduct. For example, an infected computer may attempt to establish many connections per second to increase the possibility of spreading. The virus throttle limits the number of new connections per second that can be made.

One limitation of the virus throttle described above is that the approach is specifically connection-based. Only new, outbound connections are restricted. The virus throttle as described does not protect connections that are already open, nor does it address inbound traffic. Thus, the described virus throttle is limited both in scope and flexibility.

BRIEF DESCRIPTION OF THE DRAWINGS

The description of embodiments of the invention includes various illustrations by way of example, and not by way of limitation in the figures and accompanying drawings.

DETAILED DESCRIPTION

In one embodiment the flow of traffic may be rate-limited at a network device. Restricting the packet flow of ingress traffic may operate to reduce the risk of DoS attacks. Restricting the packet flow of egress traffic from a device may operate to reduce the risk of infection, or the spread of malware from one machine to another. With rate limits at each machine, the spread within a subnet is reduced with respect to traditional wide open network connections.

Various references herein to an "embodiment" are to be understood as describing a particular feature, structure, or characteristic included in at least one embodiment of the invention. Thus, the appearance of phrases such as "in one embodiment," or "in alternate an embodiment" may describe various embodiments of the invention, and may not necessarily all refer to the same embodiment.

Figure 1:
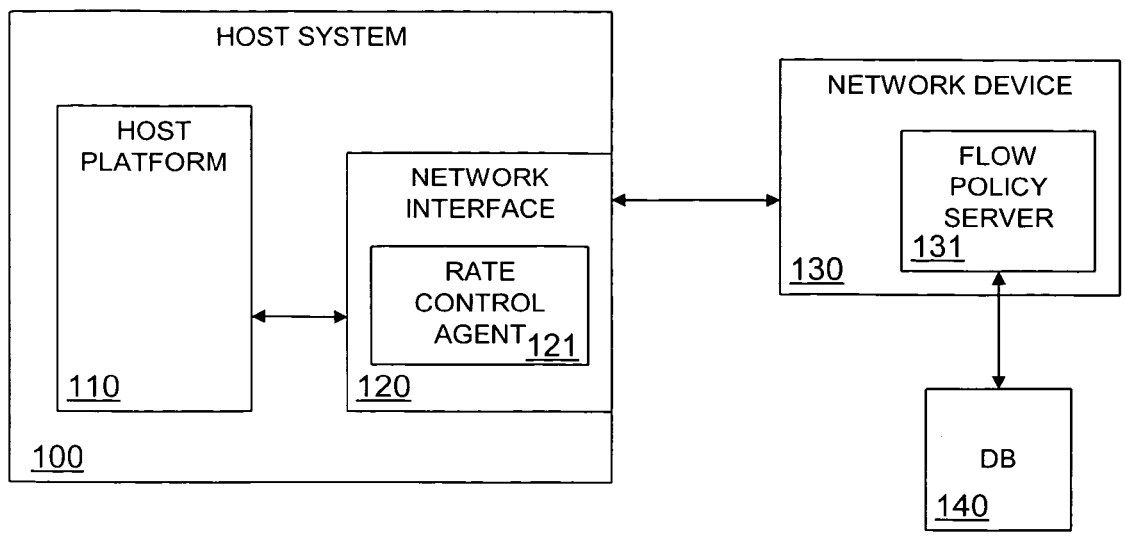
FIG. 1 is a block diagram of a system with a network interface having a rate control agent in accordance with an embodiment of the invention.

FIG. 1 is a block diagram of a system with a network interface having a rate control agent in accordance with an embodiment of the invention. Host system 100 interfaces with network device 130 through network interface 120. Host system 100 represents a variety of electronic systems, devices, or apparatuses. For example, host system 100 may include a personal computer (desktop, laptop, palmtop), a server, a handheld computing device, personal digital assistant (PDA), wireless computing device, cellular phone, game console, set-top box, etc. Host system 100 may be a terminating device of a network, or a user device of the network. Note that even in a case where system 100 is a server, it may be considered a "user" of the network.

Host system 100 includes host platform 110, which represents hardware and/or software to perform operation of system 100. Host platform 110 may include various hardware modules, subsystems, and/or circuits, as well as various software modules, applications, subroutines, etc. Host platform 110 includes an operating system or equivalent, and may include a motherboard/main circuit board, or equivalent. Host platform 110 provides the environment on which to execute user applications and system functions.

In one embodiment host system 100 includes network interface 120 to interact (e.g., transmit/receive/exchange traffic) over the network with devices external to system 100. Traffic transmitted, received, and/or exchanged may be considered to go through, or pass through a networked device. Network interface 120 may include a network interface card, a network interface circuit built onto a computing platform, a wireless or wireline communication transceiver, etc. Network interface 120 may support multiple mechanisms that provide interface to the network, including multiple ports, various protocols (e.g., Internet protocol (IP), Internet control message protocol (ICMP), transmission control protocol (TCP), user datagram protocol (UDP), simple network management protocol (SNMP), Telnet, file transfer protocol (FTP), hypertext transfer protocol (HTTP), etc.), and may include various open connections. In one embodiment each port, connection, protocol, etc. may be considered a network interface from system 100 to another system on the network.

In one embodiment system 100 communicates with network device 130 through network interface 120. Network device 130 represents a hardware and/or software entity at a network node, e.g., a switch, a gateway, a router, a network access point, or other item of a network infrastructure. Network device 130 may be considered an edge device that provides a path to the network. In one embodiment network device 130 performs authentication services to verify the identity of system 100 prior to granting authorization to system 100 to access the network, or determining what type of service may be allocated to host system 100. Alternatively, authentication services could be performed separately from network device 130, or network device 130 could be in communication over the network with an authentication server.

In one embodiment network device 130 includes flow policy server 131, which represents a hardware and/or software module/node to provide a traffic flow policy. A traffic flow policy may include a description/listing of traffic flow rates permissible, and/or traffic flow limits imposed on host system 100. In one embodiment the traffic flow policy is part of a network policy describing the service available, the permitted use by, and/or the conditions under which host system 100 communicates over the network. The type of use permitted for system 100 may depend upon the role system 100 has in the network. For example, authentication credentials may reveal that system 100 is a server, and is responsible for traffic to and from a local area network (LAN). The permitted use of a server may be different than, for example, a corporate user, a personal user, etc.

Flow policy server 131 may indicate conditions for each interface of host system 100. For example, particular ports, protocols, and/or connections may be differentiated in the service allocated for each. A network policy/flow policy may indicate a permissible frequency, or packet flow for individual interfaces. Thus, one port may be limited to a certain number of packets per second, and another port may be limited to a different number of packets per second. Certain protocols may be restricted to a certain number of packets per second. Likewise, connections to particular network destinations may be limited to a certain frequency of packets. The policy may indicate the packet flow restrictions based on, for example, the extent to which the connection/port is trusted, an expected behavior of the port/protocol, in response to a perceived or a previous security violation on the interface, etc. By limiting the traffic flow, the spread of malware can be significantly slowed, and DoS attacks can rendered less effective or ineffective.

The policy or policies may be stored in database 140, which is accessible to flow policy server 131, either remotely, or locally. In one embodiment database 140 stores more than the network policies, such as authentication information. In one embodiment database 140 is a policy decision maker. Note that the policies may be established that apply restrictions equally across all interfaces, or differentiate between the interfaces. A policy may indicate a rate limit for a protocol, and rate limits for certain ports. In the case of overlapping policies, the lower flow limit may be used.

In one embodiment network interface 120 includes rate control agent 121. Rate control agent 121 may be a module on network interface 120. For example, rate control agent 121 may be software/firmware running on hardware (e.g., a processor) on network interface 120. Alternatively, rate control agent 121 may include an embedded processor having programming information and/or data stored in a local memory subsystem. The memory subsystem may include non-volatile memory, random access memory (RAM), Flash, a memory controller, etc. On network interface 120, rate control agent 121 may be independent of, and transparent to, a host operating system (OS). Because software and hardware visible to the OS may be subject to being compromised, if an intruder compromised the OS, rate control agent 121 transparent to the OS may be less likely to be compromised by attack. Thus, having flow agent as a hardware element and/or as a software/firmware element in a hardware element of network interface 120 may provide added security to host system 100.

Rate control agent 121 represents the agent/module to implement/enforce the policy received from flow policy server 131. Rate control agent 121 may operate by restricting the traffic flow of various ports, protocols, connections, etc., of network interface 120. Rate control agent 121 may monitor a number of packets on ingress and/or egress for an interface, and determine whether the number of packets has reached or exceeded a threshold number specified in the flow policy, or a maximum number allotted in the flow policy. In the context of the traffic flow policy, the expression maximum may or may not be understood to be an absolute maximum. For example, a certain number of packets may be specified as a maximum, and when the number has been reached, certain actions may be performed to restrict the packets in excess of the number. For example, the packets may be dropped, or they may be buffered and delayed. The delay would operate to allow the packets to be sent, but at a rate slower than that at which they are received or prepared for transmission. If packets are buffered and delayed, a buffer overrun may cause additional packets to be dropped.

Note that the packet restricting is performed by rate control agent 121 at host system 100. Whereas quality of service (QoS) is performed at an enforcing network node, the traffic flow limiting is performed at an individual network user. Thus, QoS does not operate to prevent a user from overloading the network, because QoS deals on a macro level with traffic from multiple sources. In contrast, the traffic flow limiting described herein operates at the user device, and may prevent an individual machine from engaging in negative network behavior. Note also that rate control agent 121 may restrict connections that are already open, as well as implementing restrictions on new connections. Additionally, as discussed more below, the flow restrictions can be made to be dynamic, and/or the policy may be periodically checked to provide updated limits, making the flow limiting described herein dynamic and adaptable to changes in the network environment.

Figure 2:
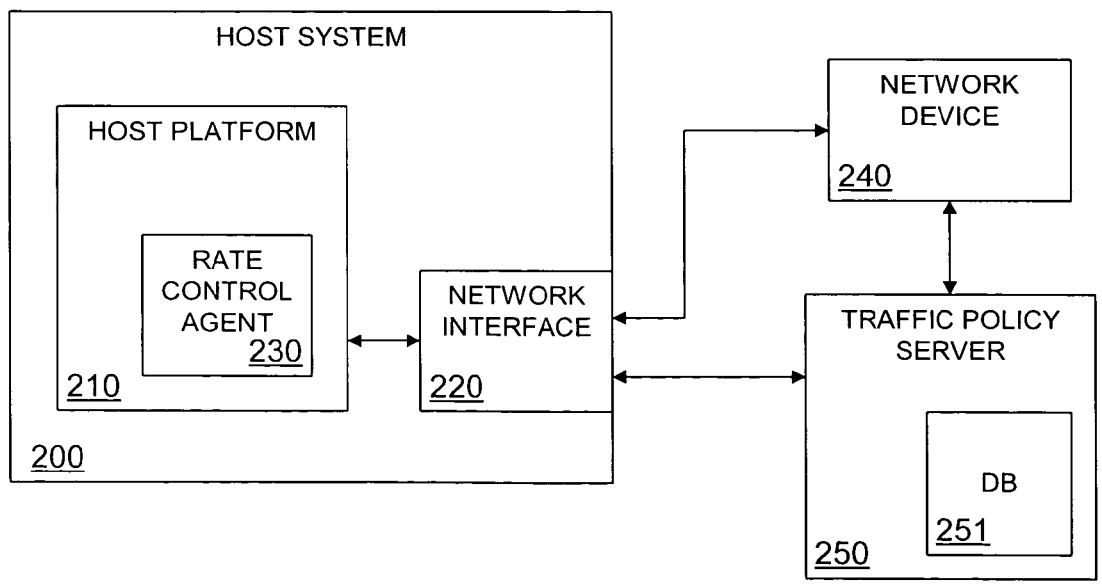
FIG. 2 is a block diagram of a system with a rate control agent in accordance with an embodiment of the invention.

FIG. 2 is a block diagram of a system with a rate control agent in accordance with an embodiment of the invention. Host system 200, host platform 210, and network interface 220 are similar to the corresponding elements of FIG. 1 above, and will not be discussed in detail here. In one embodiment host system 200 communicates through network interface 220 with network device 240. Network device 240 represents a gateway, router, firewall, access point, etc., and may be a network edge device, interconnecting host system 100 to a network.

In one embodiment host system 200 communicates through network interface 220 with traffic policy server 250. Traffic policy server 250 may be a separate entity from network device 240 and may communicate with host system 200 through network device 240. Alternatively, traffic policy server 250 may have a connection with host system 200 through network interface 220, independent of network device 240. Traffic policy server 250 may include database 251 of traffic policies and/or network policies. In one embodiment traffic policy server 251 monitors network traffic flow of one or more interfaces of host system 200 and may determine to update policies.

In one embodiment host platform 210 includes rate control agent 121, which represents a monitoring and/or enforcing mechanism for network/traffic policies. Rate control agent 121 may be a software/firmware module in a processor of host platform 210. In one embodiment, rate control agent 121 is implemented as an embedded system/subsystem in a processor on host platform 210. In another embodiment, rate control agent 121 may be, in whole or in part, a software module operating between the host OS and the interface drivers for network interface 220.

Figure 3:
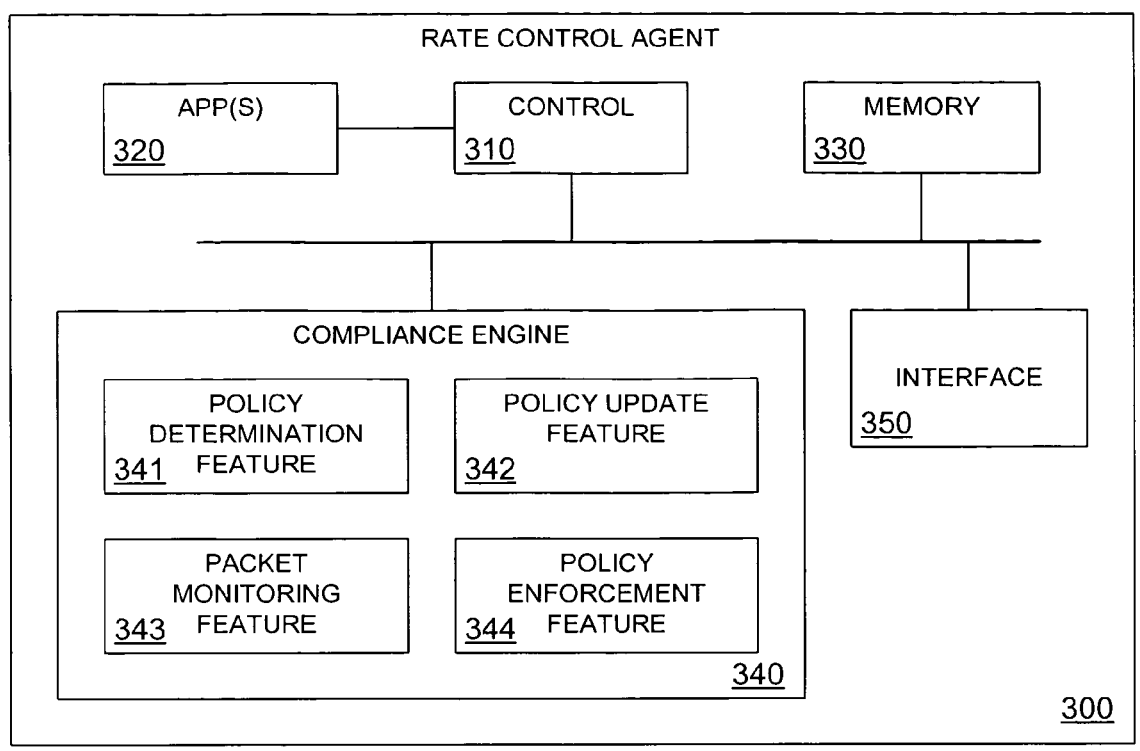
FIG. 3 is a block diagram of a rate control agent in accordance with an embodiment of the invention.

FIG. 3 is a block diagram of a rate control agent in accordance with an embodiment of the invention. Rate control agent 300 represents a circuit, a combination of logic, firmware and/or group/series of instructions for execution on a computation/logic device, a subsystem, or a virtual subsystem that is configured, enabled, or otherwise able to perform operations related to integration of authentication and policy enforcement services. Control logic 310 directs the flow of operation of agent 300. In one embodiment, control logic 310 is a series of software/firmware instructions to perform logic operations. In another embodiment, control logic 310 can be implemented by hardware control logic, or a combination of hardware-based control logic and software instructions.

Interface 350 provides a communication interface between agent 300 and an external electronic system (not shown) and/or network. For example, agent 300 as part of a host computing system may have interface 350 to provide a communication interface between agent 300 and the host computing system via a system bus, for example, on a host platform, or on a network card/circuit. In one embodiment interface 350 includes a communication path to a network. For example, interface 350 may include an interface to an Ethernet, Internet, wireless communication channel, etc. The communication path may be private to agent 300, shared with other agents, or an access path allocated by a system/subsystem of which agent 300 is a part. If the communication path is shared, it could be arbitrated, as is understood in the art.

Agent 300 may include applications 320. Applications 320 represent one or more programs and/or other series of instruction sequences that are executed on control logic 310. In one embodiment agent 300 may execute part of all of a user application or a system application. Applications 320 may provide instructions to control logic 310 to cause agent 300 to perform operations. Instructions may also be provided to control logic 310 by memory 330. For example, control logic 310 may access, or read a portion of memory 330 to obtain instructions to perform a series of operations and/or data for use with operations. Thus, control logic 310 can receive one or more instructions from internal application software running locally on rate control agent 300, such as applications 320, from memory 330, and/or from external applications, storage media, etc., through interface 350.

Agent 300 includes compliance engine 340. In one embodiment compliance engine 340 may be considered an enforcement module. In one embodiment agent 300 may perform operations including accessing/reading a policy, determining a policy to apply to a network interface, monitoring traffic flow, obtaining and/or gathering traffic statistics, delaying packets, dropping packets, indicating a change to a policy maker, etc. Compliance engine 340 is shown with various features, which represent functions or features that compliance engine 340 may provide. Each function or feature is provided through performing one or more operations. Compliance engine 340 may include one or more of: policy determination feature 341, policy update feature 342, statistics monitoring feature 343, and policy enforcement feature 544. In one embodiment one or more of these features may exist independently of and/or be external to agent 300. Thus, compliance engine 350 may be more complex or less complex, containing some, all, or additional features to those represented in FIG. 3.

Policy determination feature 341 enables agent 300 to ascertain a policy that will be enforced on a network interface with which the policy is associated. In one embodiment policy decision feature 341 obtains a policy from a remote location, such as from a node/entity on the network, for example, from a policy server. The policy may be obtained at one point and used at a later point, and/or used upon obtaining the policy. A policy server may be queried/polled to determine if a policy update exists. Policy determination feature 341 may enable agent 300 to periodically update the policy, or obtain a new policy upon an indication of a policy update by a policy server. The policy may indicate restrictions on packet flow frequency for a port, a group of ports, one or more protocols, connections to particular addresses, or connections to devices that have any address other than specified addresses/subnets, etc.

In one embodiment the policy may indicate a lock-down mode, or equivalent. Such a mode of operation may occur, for example, if the policy decision point is aware of a particular malware or hacker threat. In a lock-down mode, all traffic may be halted. Alternatively, particular traffic to/from a known trusted source may be permitted and all other traffic restricted. In one embodiment a policy may indicate, for example port, protocol, and or connection combinations to prevent the kazaa traffic, peer-to-peer (P2P) traffic, etc. Traffic associated with a known remote server may be allowed unrestricted access. The policy may be different based on the role of the device to which the policy applies. In one embodiment a degraded level of service may be allowed, where one or more interfaces may be allowed access, but under restricted traffic flow constraints (possibly resulting in noticeable delay to the user on those interfaces).

Policy update feature 342 enables agent 300 to indicate a change in operation to a policy decision maker. In one embodiment this includes a routine/algorithm to determine based on gathered statistics whether a policy change would be advisable for a particular interface. For example, traffic associated with a particular interface could be monitored, and a sudden large increase in traffic observed. Based on the protocol, the connection, a history of use of the interface, etc., policy update feature 342 may determine that the increase in traffic flow exceeds a trigger level and may request a policy update of a policy decision point. Alternatively, policy update feature 342 may alter a local copy of the policy and indicate the change to a policy server.

Changes in traffic policy may be made at a policy server from which rate control agent 300 obtains the policy to enforce on the network interfaces. Policy changes may occur when an information technology administrator makes a change and pushes the new policy to the policy server. The policy server may then in turn push the change out to the connected devices. An automated threat detection and/or reaction system may determine a new threat exists and/or receive a threat warning, and enter a degraded mode of operation, or target a policy change to a network interface that would likely be the target of the threat.

Statistics monitoring feature 343 enables agent 300 to perform operations relating to statistics, or information relating to the flow of traffic in one or more interfaces. For example, agent 300 may track, access, and/or interpret statistics. In one embodiment agent 300 includes the ability through compliance engine 340 to monitor statistics, by observing and recording activity at a network interface. One statistic that may be kept is that of packet frequency at the interface. Alternatively, or in addition, agent 300 may query or request another module that keeps statistics on an interface of interest. Agent 300 may also have access to data/statistics stored by an entity that monitors the statistics. In one embodiment statistics monitoring feature 343 may operate to gather statistics that will be used by compliance engine 340, or an external policy decision maker to update a network policy.

Policy enforcement feature 344 enables agent 300 to implement the traffic policy. In one embodiment policy enforcement feature 344 is an enforcement module, in hardware, software, or a combination. Enforcement feature 344 may determine if a rate limit or a traffic threshold/maximum has been reached by an interface. Enforcement feature 344 may determine based on a network policy and local statistics (local statistics to the device having the network interface in question) how to deal with traffic for an interface.

For example, if a threshold has been reached, future traffic may be delayed until a future time. Thus, if a rate of 1000 packets per second were allotted for transmit from a particular port, and the threshold of 1000 packets has been reached in the first 500 milliseconds, additional packets waiting to be transmitted may be delayed for 500 milliseconds prior to transmission. Alternatively, 1000 packets may be organized and transmitted at a spaced time, or bursts of packets may be transmitted at spaced intervals to accommodate the 1000 packets per second threshold.

In another example, packets in excess of the threshold may be dropped, and a message sent back to the originator that the packets were dropped. The message may include an indication of the delay, which could be implemented through the originator. An application layer module, for example, may provide a pre-scheduling to delay packets in keeping with the network policy. Alternatively, a transport layer function could accomplish the same thing. Hardware/software at a network interface circuit or network interface card could monitor and/or delay and/or drop packets. The specific mechanisms of flow control are not critical, and many methods can be conceived by those of skill in the art.

In one embodiment agent 300 is implemented with firmware, software, or a combination of firmware and software. Agent 300 may be implemented in hardware and/or a combination of hardware and software and/or firmware. The software and/or firmware content may provide instructions to cause executing hardware to perform various operations, including some or all of the functions/features described above. Instructions to cause a machine/electronic device/hardware to perform the operations may be received via an article of manufacture. An article of manufacture may include a machine accessible medium having content to provide the instructions. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc.

Figure 4:
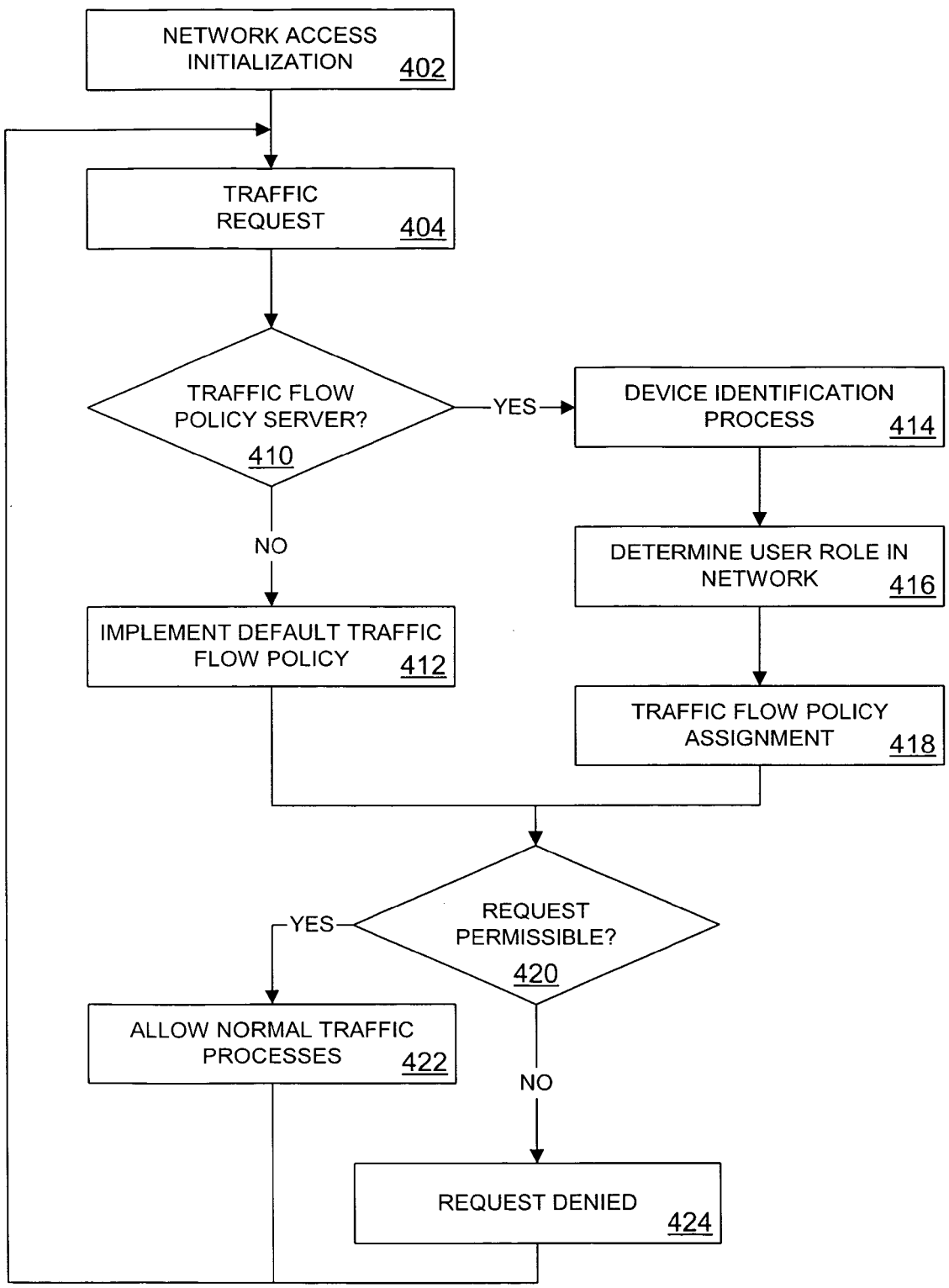
FIG. 4 is a flow diagram of a system implementing a traffic flow policy in accordance with an embodiment of the invention.

FIG. 4 is a flow diagram of a system implementing a traffic flow policy in accordance with an embodiment of the invention. A networked device requests access to a network, and network access is initialized, 402. A static Internet protocol (IP) address may be assigned, a dynamic host configuration protocol (DHCP) assignment, a wireless access channel assignment, etc. The address/channel assignment can be used by the device to establish one or more network interfaces. A traffic request may be made to configure the network access of the device, 404. Network access may be configured for ingress and egress traffic.

In one embodiment a traffic policy server may be present. A device may look on the network for a traffic flow policy server, 410. If there is no traffic flow policy server, the device may implement a default traffic flow policy, 412. The default policy may be pre-configured in the device prior to network access initialization. Alternatively, during initialization a default policy may be given to the device, which the device would implement in the absence of a policy server. In one embodiment the traffic flow policy server may be an authentication entity, or part of an authentication entity. Alternatively, the traffic flow policy server may sit separately on the network.

If a traffic flow policy server is available, an identification process may be executed, 414. This may or may not be the same process as used to authenticate the networked device for network access. The identification process in this sense refers to the identifying of the device for purposes of assigning a traffic flow policy. One or more credentials may be transferred between the device and the traffic flow policy server, e.g., device identity. Based at least in part on the identification of the device, the traffic flow policy server may determine the device role in the network, 416. Alternatively, the device may be configured to provide its role in the identification process. The role in the network is used to determine an appropriate policy for the device.

For example, a server plays a much different role in a network than an end-user device serving a single user. Likewise, a device that is a known entity on the network may have a different role than a "guest" machine on the network, especially one with a less certain identity. In one embodiment a policy is pre-defined for devices of a particular class (e.g., server, corporate user, guest, administrator, etc.), and once the class is determined, the policy is assigned corresponding to the class. In another embodiment each separate user has a specific policy assigned. The conditions for the policy may be, for example, based on historical use of past statistics, a determined threat level posed by the user, etc. Once the user has been identified and a traffic flow policy determined, the traffic flow policy assignment is made, 418.

The policy may then be implemented. A request for traffic, ingress and/or egress, depending on the policy assigned, may be evaluated against the policy to determine if the request is permissible, 420. For example, if the device is allotted a particular number of ingress TCP packets on a particular network interface, a number received can be evaluated against the policy. If the number allotted is already reached, other packets may be delayed, for example, at the gateway serving the device. Thus, if the request is not permissible, the request is denied, 424. This may include delaying or dropping packets.

If the request is permissible according to the traffic flow policy, normal traffic processes are allowed to continue, 422. The normal flow of traffic may continue uninterrupted, and not delayed. Another traffic request may be made. In one embodiment 410 to 418 may not be performed on a future request. They may be performed on a periodic basis, or whenever a policy update is made. Thus, after a traffic request, 404, the request may be determined to be permissible or not, 420, without performing other steps.

Figure 5:
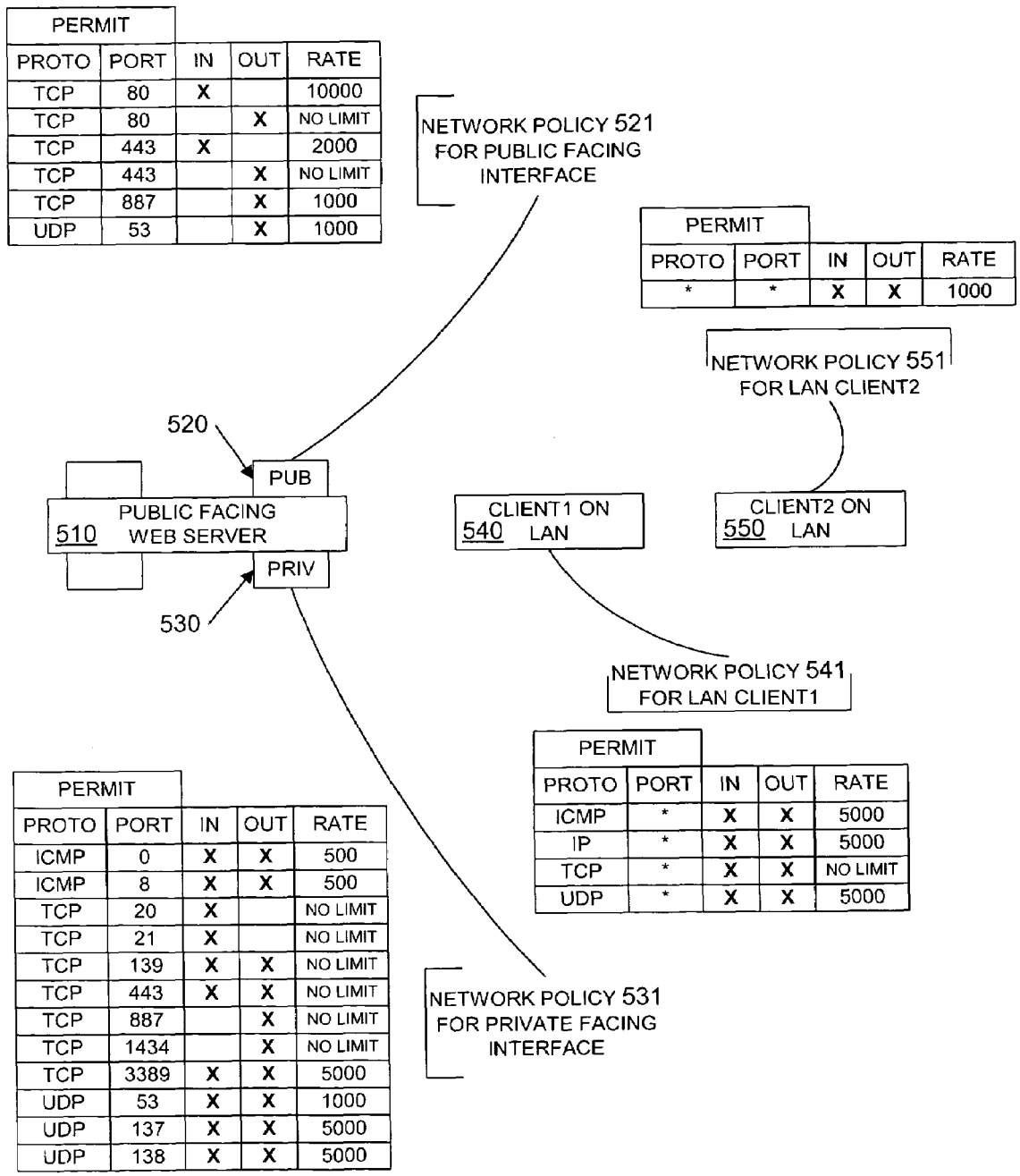
FIG. 5 is a representation of permitted traffic allowances for various network devices in accordance with an embodiment of the invention.

FIG. 5 is a representation of permitted traffic allowances for various network devices in accordance with an embodiment of the invention. In one embodiment server 510 is subject to a network policy specifying traffic flow limitations for certain network interfaces on the server. For example, public facing interface 520 is subject to network policy 521, which specifies permitted traffic for various protocols and ports. As shown, ingress TCP traffic on port 80 may be restricted to 10000 packets per second. As a server, this restriction may prove to have a higher threshold than restrictions on, for example, client1 540 and client2 550. The ingress limit may restrict the risk that the server will be overloaded with received traffic. As shown, egress TCP traffic on port 80 may not have a limit. Note that a web server may want to be able to serve as much traffic as possible, restricted only by the interconnection bandwidth so that it does not cause access delay to devices accessing its web pages. Thus, the ingress and egress limits are customized for the particular role server 510 has in the network. Other permitted traffic flow follows is illustrated as an example, and may be determined based on the expected behavior of server 510.

Private facing interface 530 is subject to network policy 531, which includes traffic that is permitted based on whether the traffic is of a particular protocol (proto), what port, and/or whether the traffic is inbound or outbound. Note that the traffic allowances for the private facing side may be different than the allowances for the public facing side. Note also that the same network interface (e.g., a port and/or protocol) may have separate threshold values, or rate limits (rate) for inbound (in) and outbound (out) traffic. The flexibility allows a very customized approach to rate-limiting traffic flow, which in turn allows a very customized approach to slowing the spread of malware, or lowering the effectiveness of a possible DoS attack.

Client1 540 is governed by network policy 541, which illustrates that a rate limit may be based on a protocol only, without reference to a port. Thus, for IP traffic, for example, network policy 541 specifies an input and output rate of 5000 packets per second. Client2 550 is governed by network policy 551, which simply specifies a limit on any connection, without reference to a protocol or port. For example, a guest device on a network may be offered only a degraded mode of access. In another embodiment a subnet may be known to be infected with a virus and all traffic could be indicated to drop to a lock-down mode. The traffic rate of a lock-down mode may be indicated by a policy server, or may be stored in a device, and then applied upon indication of an alert, for example.

Besides what is described herein, it will be appreciated that various modifications may be made to embodiments of the invention without departing from their scope. Therefore, the illustrations and examples herein should be construed in an illustrative, and not a restrictive sense. The scope of the invention should be measured solely by reference to the claims that follow.

What is claimed is:

1. A method of traffic control in a networked user device, comprising:
    accessing a traffic flow policy associated with the networked user device, the policy to indicate a threshold traffic flow for packets associated with network interfaces of the networked user device, the network interfaces each having a network port and protocol, the policy to be implemented at the networked user device, wherein the policy indicates separate threshold traffic flows based on network port and protocol;
    rate-limiting at the networked user device with a policy enforcement module of the network interface devices of the networked user device, the traffic flow of packets based, at least in part, on the traffic flow policy, where the rate-limiting includes limiting the rate of traffic flow for one of the network interfaces at a different rate than traffic associated with a different network interface of the networked user device based on the port and protocol of each network interface;
    receiving a network alert indicating a potential threat on a network to which the network interface device is connected; and
    automatically operating in a degraded mode of operation with a low traffic flow or no traffic flow permissible for one or more network interfaces of the networked user device instead of the threshold indicated in the policy in response to receiving the network alert.

2. A method according to claim 1, wherein the policy to indicate a threshold traffic flow for packets associated with the network interface of the device comprises the policy to indicate a threshold traffic flow for a network connection of the device.

3. A method according to claim 1, wherein rate-limiting the traffic flow further comprises:
    capturing local traffic statistics, the local statistics to indicate a traffic flow of the network interface; and
    determining based at least in part on the local statistics to change the traffic flow policy.

4. A method according to claim 3, wherein determining based on the local statistics to change the traffic flow policy comprises determining to increase the threshold traffic flow for the network interface.

5. A method according to claim 1, wherein rate-limiting the traffic flow comprises delaying packets in excess of the threshold to cause the traffic flow to be in compliance with the policy.

6. A network flow control agent on a networked user device, comprising:
    a memory interface to access a network flow policy stored on a storage device, the policy indicating a flow rate limit for packets associated with network interfaces of the networked user device, the network interfaces each having a network port and protocol, the policy to be implemented at the networked user device, wherein the policy indicates separate threshold traffic flows based on network port and protocol; and
    an enforcement module on the networked user device to restrict traffic through the network interfaces based at least in part on the rate limit for packets and a number of packets associated with communication through the network interfaces, the networked user device to access a network edge device through the network interface of the networked user device, where restricting the traffic through the network interface includes limiting the rate of traffic flow for one of the network interfaces at a different rate than traffic associated with a different network interface of the networked user device based on the port and protocol of each network interface;
    wherein the network flow control agent receives a network alert indicating a potential threat on a network to which the network interface device is connected, and automatically operates the enforcement module in a degraded mode of operation with a low traffic flow or no traffic flow permissible for one or more network interfaces of the networked user device instead of the flow rate indicated in the policy in response to receiving the network alert.

7. A flow control agent according to claim 6, wherein the enforcement module comprises an embedded processor on the networked user device implementing firmware, the embedded processor independent of the networked user device main operating system executing on a host central processing unit (CPU).

8. A flow control agent according to claim 6, wherein the enforcement module comprises one or more of a host processor on a network interface device of the networked user device executing software, a host processor on the networked user device executing application layer software to interface the operating system with the network interface, or a circuit in a network interface circuit performing functions to limit traffic flow on the network interface.

9. A flow control agent according to claim 6, wherein the enforcement module further accesses traffic flow statistics to determine to dynamically alter the network flow policy at the networked user device, including changing a permissible flow rate.

10. A flow control agent according to claim 9, further comprising the enforcement module to indicate the altered network flow policy to a remote network flow policy decision point.

11. A network interface system comprising:
a network interface communication circuit on a network end device, the network end device being a user device having:
a memory interface to access a network policy indicating a threshold packet flow for network interfaces of the communication circuit, the network interfaces each having a network port and protocol, the network policy to be implemented at the network end device, wherein the network policy indicates separate threshold packet flows based on network port and protocol for different network interfaces; and
a compliance agent to monitor a packet flow of the network interface and enforce the network policy to prevent the packet flow of the network interfaces from exceeding the threshold packet flow, while leaving a packet flow corresponding to at least one of the network interfaces unaffected, where preventing the packet flow from exceeding the threshold packet flow includes limiting rates of traffic flows differently for different network interfaces based on the port and protocol of the network interfaces;
wherein the compliance agent receives a network alert indicating a potential threat on a network to which the network end device is connected, and automatically operates the compliance agent in a degraded mode of operation with a low traffic flow or no traffic flow permissible for one or more network interfaces of the network end device instead of the packet flow indicated in the network policy in response to receiving the network alert; and
a non-volatile memory coupled with the network interface communication circuit to store the network policy for the network interface system.

12. A network interface system according to claim 11, wherein the network interface circuit comprises a transmitter circuit.

13. A network interface system according to claim 11, wherein the compliance agent to enforce the network policy comprises the compliance agent to enforce the network policy for ingress packets corresponding to the network interface.

14. A network interface system according to claim 11, wherein the compliance agent to monitor the packet flow further comprises the compliance agent to store statistics relating to traffic flow on the network interface.

15. A network interface system according to claim 11, further comprising a network infrastructure device to monitor traffic flow on the network interface and keep statistics on traffic for the network interface.

16. A network interface system according to claim 15, further comprising the network infrastructure device to report the statistics to the network end device.

17. A network interface system according to claim 15, wherein the network infrastructure device comprises a network gateway, and the network gateway to require the network end device to comply with the network policy to be permitted network access through the network gateway.

* * * * *